(12) United States Patent
Fu et al.

(10) Patent No.: US 9,989,725 B2
(45) Date of Patent: Jun. 5, 2018

(54) OPTICAL IMAGING LENS WITH A FIXING STRUCTURE

(71) Applicant: Genius Electronic Optical Co., Ltd., Taichung (TW)

(72) Inventors: Wei-Wei Fu, Fujian (CN); Zhen-Mu Chen, Fujian (CN); Wei-Min Li, Fujian (CN); Hai-Bin Zhan, Fujian (CN); Hung-Chang Cho, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 0 days. days.

(21) Appl. No.: 14/919,733

(22) Filed: Oct. 22, 2015

(65) Prior Publication Data

US 2017/0003472 A1    Jan. 5, 2017

(30) Foreign Application Priority Data

Jul. 3, 2015   (CN) .......................... 2015 1 0386904

(51) Int. Cl.
| G02B 9/12 | (2006.01) |
| G02B 7/02 | (2006.01) |
| G02B 5/00 | (2006.01) |
| G02B 13/00 | (2006.01) |

(52) U.S. Cl.
CPC ............ G02B 7/021 (2013.01); G02B 5/005 (2013.01); G02B 7/022 (2013.01); G02B 13/004 (2013.01)

(58) Field of Classification Search
CPC .................................. G02B 7/021; G02B 9/34
See application file for complete search history.

(56) References Cited

U.S. PATENT DOCUMENTS 8,027,104 B2 *   9/2011   Lai .................... G02B 7/021
                                                        359/704
8,902,521 B2 * 12/2014  Huang .................. G02B 7/025
                                                        359/811

(Continued)

FOREIGN PATENT DOCUMENTS

CN    102062922 B    7/2013

OTHER PUBLICATIONS

"Office Action of Taiwan Counterpart Application", dated Oct. 5, 2016, p. 1-p. 3.

Primary Examiner — Alicia M Harrington
(74) Attorney, Agent, or Firm — JCIPRNET

(57) ABSTRACT

A lens includes a barrel and a first optical element. The barrel includes an inner circumferential surface surrounding an axis and defining an accommodation space, an object side and an image side spaced at two ends of the axis and interconnecting with the accommodation space, and a first mounting portion integrally formed around the inner circumferential surface. The first mounting portion includes a first blocking portion having a first blocking surface corresponding to the object side. The first optical element is received in the accommodation space, and disposed in the first mounting portion, and includes a first body portion and a first stopping portion. The first stopping portion includes a first stopping surface leaning against the first blocking surface. The distance between an outermost edge of the first stopping portion and the axis is greater than the distance between an innermost edge of the first blocking portion and the axis.

7 Claims, 10 Drawing Sheets

(56) References Cited

U.S. PATENT DOCUMENTS

2004/0228011 A1* 11/2004 Yokota .................. G02B 5/003
                                                    359/811
2010/0140459 A1* 6/2010 Tatsuzawa ........... G02B 13/005
                                                    250/216

* cited by examiner

OPTICAL IMAGING LENS WITH A FIXING STRUCTURE

CROSS-REFERENCE TO RELATED APPLICATION

This application claims the priority benefit of Chinese application serial no. 201510386904.7, filed on Jul. 3, 2015. The entirety of the above-mentioned patent application is hereby incorporated by reference herein and made a part of this specification.

BACKGROUND OF THE INVENTION

Field of the Invention

The invention relates to an optical lens, and particularly relates to an optical imaging lens with a fixing structure.

Description of Related Art

Referring to FIG. 1, a conventional optical lens includes a barrel 5 including an inner circumferential surface 51 surrounding an axis B and defining an accommodation space 511, and a plurality of optical lenses 6 installed in the accommodation space 511. The optical lenses 6 and the barrel 5 are mounted and fixed by adopting a dispensing curing method. However, when the optical lens is subjected to an impact of an external force, if only depend on a retention force of the adhesive, a situation that the optical lenses 6 squeeze the adhesive along a direction of the axis B is probably occurred, which may cause a change of relative positions between the optical lenses 6 and produce an angle shift, and accordingly influences the imaging qualify.

SUMMARY OF THE INVENTION

The invention is directed to an optical imaging lens with a fixing structure capable of improving stableness along a direction of an axis.

The invention provides an optical imaging lens with a fixing structure. The optical imaging lens includes a barrel and a first optical element. The barrel includes an inner circumferential surface surrounding an axis and defining an accommodation space, an object side and an image side spaced at two ends of the axis and interconnecting with the accommodation space, and a first mounting portion integrally formed around the inner circumferential surface. The first mounting portion includes a first blocking portion. The first blocking portion includes a first blocking surface corresponding to the object side. The first optical element is disposed in the accommodation space, and is installed in the first mounting portion. The first optical element includes a first body portion, and a first stopping portion disposed in the first body portion. A distance between a radial outermost edge of the first stopping portion and the axis is greater than a distance between a radial innermost edge of the first blocking portion and the axis, and the first stopping portion includes a first stopping surface corresponding to the image side and leaning against the first blocking surface.

According to the above description, as the first blocking portion leans against the first stopping portion along the direction of the axis, the stableness of the first optical element along the direction of the axis is improved. Consequently, a risk of negative impact on image quality due to lens displacement caused by impact of an external force is effectively decreased.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
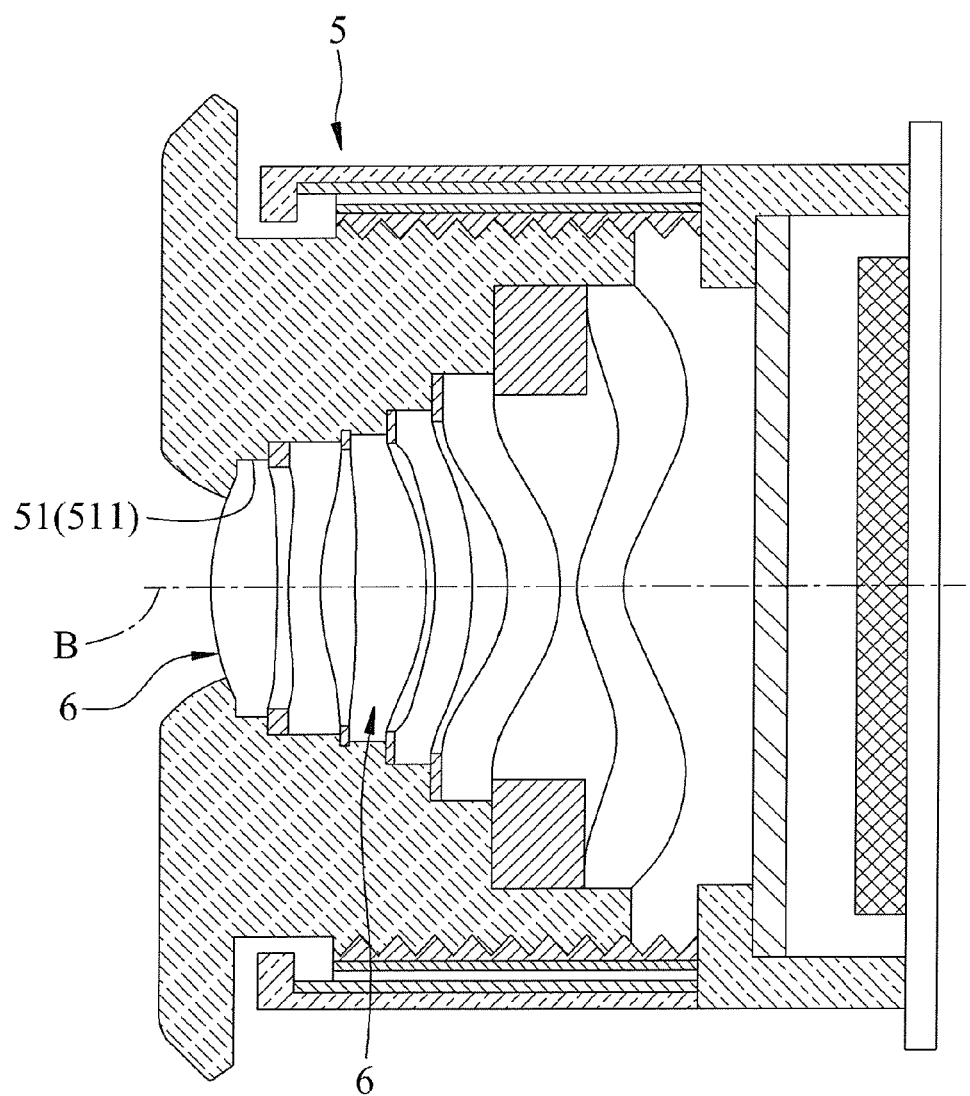
FIG. 1 is a planar cross-sectional view of a conventional optical lens.
Figure 2:
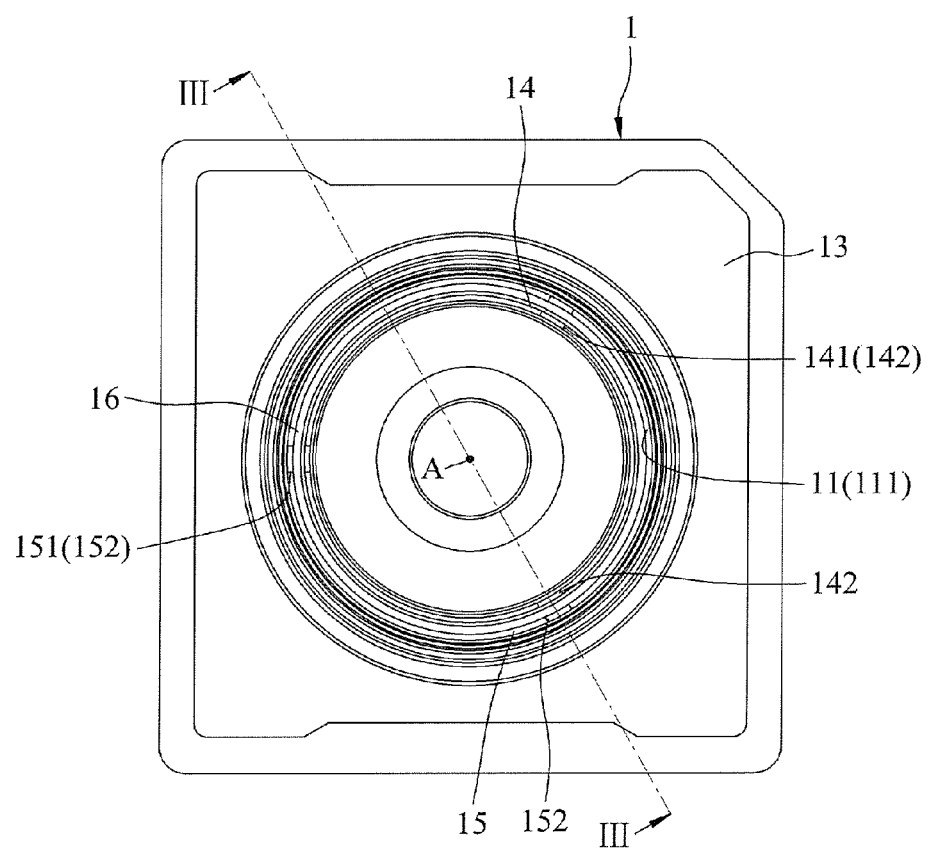
FIG. 2 is a planar diagram of an optical imaging lens with a fixing structure according to a first exemplary embodiment of the invention, in which a first optical element, a second optical element and a third optical element are omitted.

Before the invention is described in detail, it should be noted that the same elements are indicated by the same reference numbers in the following paragraphs.

Referring to FIG. 2 to FIG. 5, a first exemplary embodiment of an optical imaging lens with a fixing structure of the invention includes a barrel 1, a first optical element 2, a second optical element 3 and a third optical element 4. One of the barrel 1 and the first optical element 2 has deformable elasticity. One of the barrel 1 and the second optical element 3 has the deformable elasticity.

The barrel 1 includes an inner circumferential surface 11 surrounding an axis A and defining an accommodation space 111, an object side 12 and an image side 13 spaced at two ends of the axis A and interconnecting with the accommodation space 111, a first mounting portion 14 integrally formed around the inner circumferential surface 11, a second mounting portion 15 arranged in line with the first mounting portion 14 along a direction of the axis A and located closer to the image side 13 compared with the first mounting portion 14 and integrally formed around the inner circumferential surface 11, and a third mounting portion 16 located between the first mounting portion 14 and the second mounting portion 15 and integrally formed around the inner circumferential surface 11. The first mounting portion 14 includes a first blocking portion 141 having three first blocking sections 142. The first blocking sections 142 are arranged at intervals along a circumferential direction, and extend towards the axis A along a radial direction from the inner circumferential surface 11, respectively, and together form a first blocking surface 143 corresponding to the object side 12. The second mounting portion 15 includes a second blocking portion 151 having three second blocking sections 152. The second blocking sections 152 are arranged at intervals along the circumferential direction, and extend towards the axis A along the radial direction from the inner circumferential surface 11, respectively, and together form a second blocking surface 153 corresponding to the object side 12. In the present embodiment, when viewing from the image side 13 to the object side 12 (referring to FIG. 2), connection lines of the first blocking sections 142 and the axis A are overlapped with connection lines of the corresponding second blocking sections 152 and the axis A (shown as a section line III of FIG. 2).

The first optical element 2 is disposed in the accommodation space 111, and is installed in the first mounting portion 14. The first optical element 2 includes a first body portion 21, a first stopping portion 22 disposed in the first body portion 21, a first image side surface 23 corresponding to the image side 13, and a first concave portion 24 formed on the first image side surface 23. A distance between a radial outermost edge of the first stopping portion 22 and the axis A is greater than a distance between a radial innermost edge of the first blocking portion 141 and the axis A, and the first stopping portion 22 includes a first stopping surface 221 corresponding to the image side 13 and leaning against the first blocking surface 143. In the present embodiment, the first stopping portion 22 extends outwards from the first body portion 21 along the radial direction, and is disposed around the first body portion 21, and protrudes out of the first body portion 21. The first optical element 2 is an optical lens.

The second optical element 3 is disposed in the accommodation space 111, and is installed in the second mounting portion 15. The second optical element 3 includes a second body portion 31, a second stopping portion 32 disposed in the second body portion 31, a second object side surface 33 corresponding to the object side 12, and a second convex portion 34 extending towards the object side 12 from the second object side surface 33. A distance between a radial outermost edge of the second stopping portion 32 and the axis A is greater than a distance between a radial innermost edge of the second blocking portion 151 and the axis A, and the second stopping portion 32 includes a second stopping surface 321 corresponding to the image side 13 and leaning against the second blocking surface 153. In the present embodiment, the second stopping portion 32 extends outwards from the second body portion 31 along the radial direction, and is disposed around the second body portion 31, and protrudes out of the second body portion 31. The second optical element 3 is an optical lens.

The third optical element 4 is disposed in the accommodation space 111, and is installed in the third mounting portion 16. The third optical element 4 includes a third object side surface 41 corresponding to the first image side surface 23, a third convex portion 42 extending towards the first optical element 2 from the third object side surface 41 and engaged with the first concave portion 24, a third image side surface 43 corresponding to the second object side surface 33, and a third concave portion 44 formed on the third image side surface 43 and engaged with the second convex portion 34. In the present embodiment, the third optical element 4 is an optical lens.

In an assembling process, the first, the third and the second optical elements 2, 4 and 3 are sequentially placed into the accommodation space 111 from the object side 12 to the image side 13. Since one of the barrel 1 and the first optical element 2 has deformable elasticity, and one of the barrel 1 and the second optical element 3 has the deformable elasticity, during a process of installing the first and the second optical elements 2 and 3 into the first and the second mounting portions 14 and 15, although a short hard interference is encountered, the first and the second optical elements 2 and 3 can be installed in place without producing an internal stress due to the elastic deformation of one of the aforementioned components. As the first blocking surface 143 and the second blocking surface 153 respectively lean against the first stopping surface 221 and the second stopping surface 321 towards the object side 12 along the direction of the axis A, the stableness of the first and the second optical elements 2 and 3 along the direction of the axis A is respectively improved. Consequently, a risk of negative impact on image quality due to lens displacement caused by impact of an external force is effectively decreased.

It should be noted that a mounting and fixing procedure between the first and the second optical elements 2 and 3 and the barrel 1 may omit the dispensing curing step, but only adopt the fixing structures of the first and the second blocking portions 141 and 151 and the first and the second stopping portions 22 and 32 to achieve the mounting and fixing effect, such that an assembling time may be shortened, and an assembling speed may be effectively improved.

It should be noted that in the present embodiment, although the number of the optical elements 2, 3 and 4 is three, such number can also be two or four or more, and the invention may also only include one of the optical elements 2, 3 and 4. Moreover, in the present embodiment, the optical elements 2, 3 and 4 are all optical lenses, though other optical elements such as spacers or retaining members can also be adopted.

Moreover, the fixing structures of the first and the second blocking portions 141 and 151 and the first and the second stopping portions 22 and 32 are not limited to be arranged on the first and the second optical elements 2 and 3 and the corresponding mounting portions 14 and 15 as that presented in the present embodiment, but can be set on any of the optical elements 2, 3 and 4 and the corresponding mounting portions 14, 15 and 16.

Figure 3:
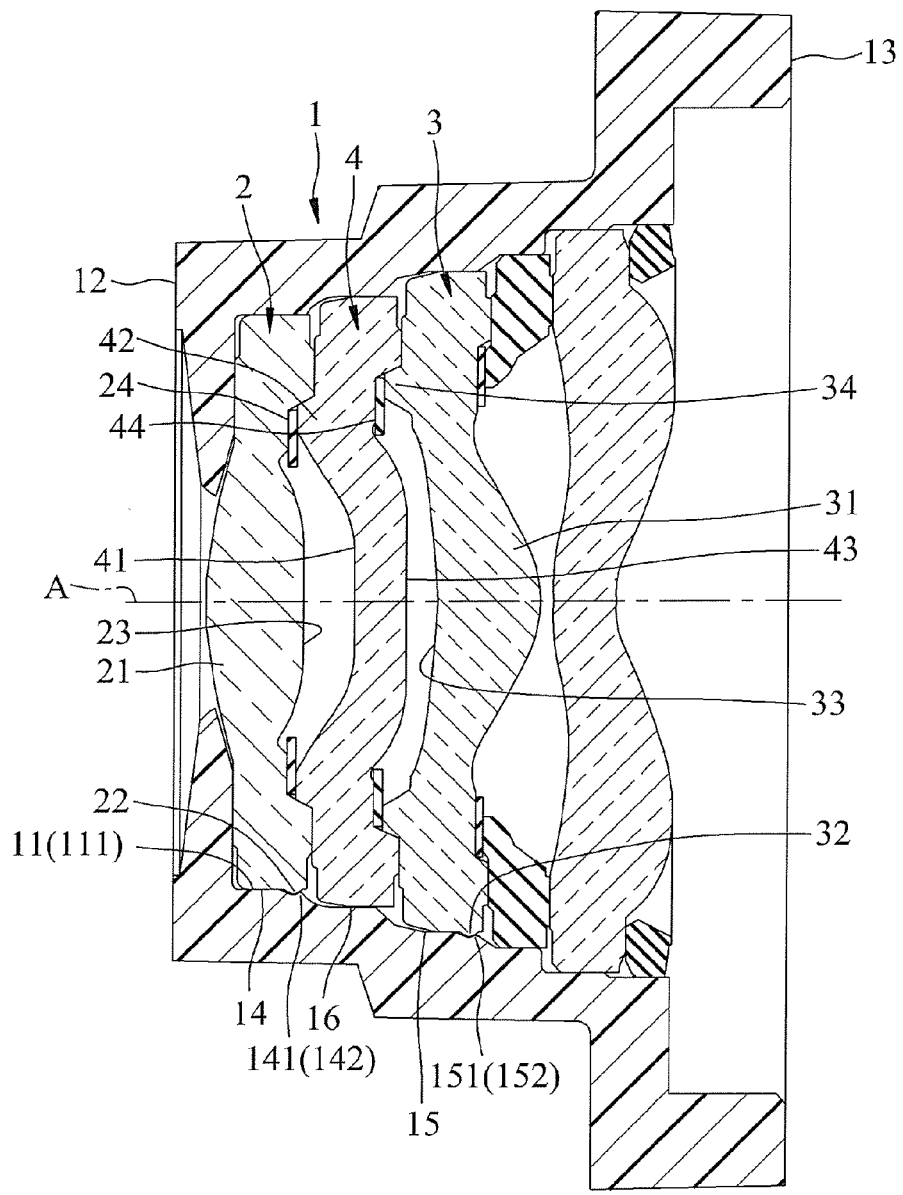
FIG. 3 is a cross-sectional view taken along a section line in FIG. 2.
Figure 4:
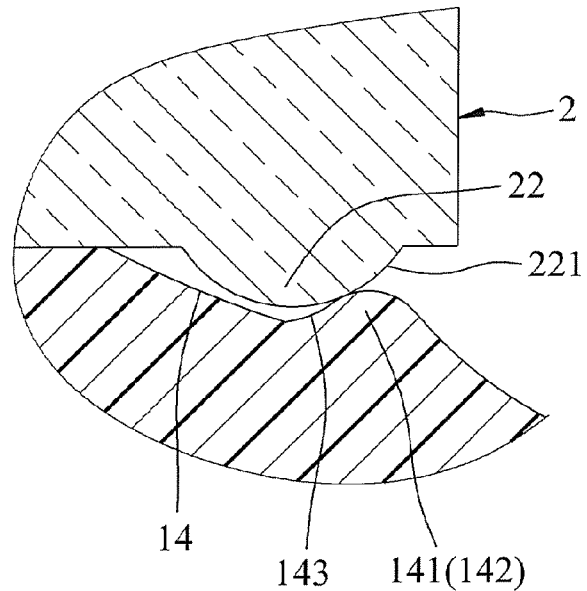
FIG. 4 is a partial enlarged view of FIG. 3, which illustrates a fixing relationship between a first blocking portion and a first stopping portion.
Figure 5:
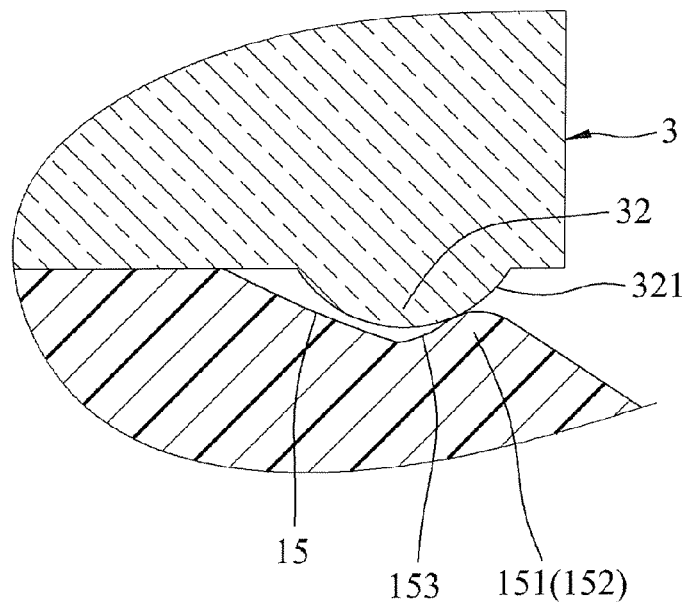
FIG. 5 is a diagram similar to FIG. 4, which illustrates a fixing relationship between a second blocking portion and a second stopping portion.
Figure 6:
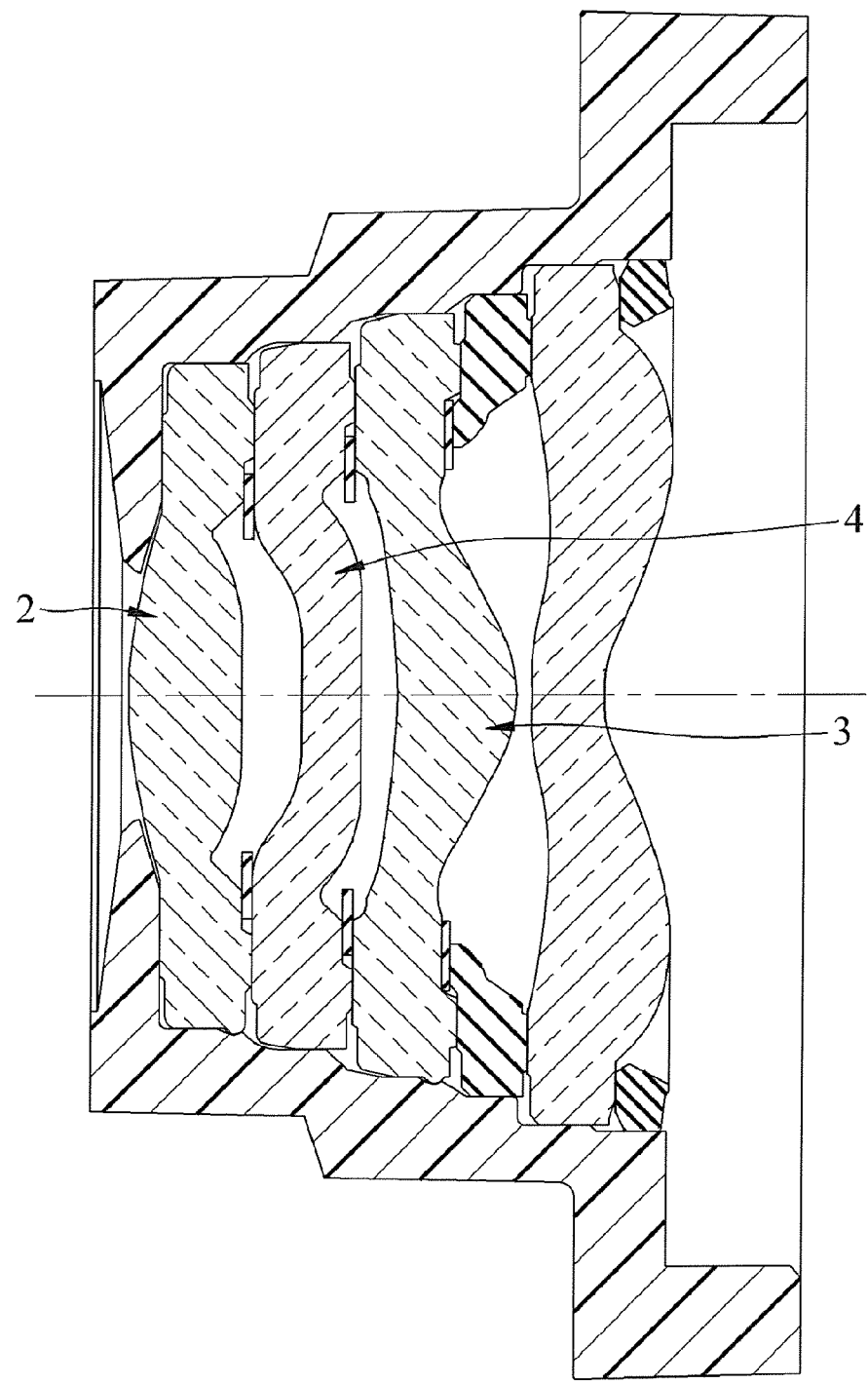
FIG. 6 is a planar cross-sectional view of an optical imaging lens with a fixing structure according to a second exemplary embodiment of the invention.

Referring to FIG. 3 and FIG. 6, a second exemplary embodiment of the optical imaging lens with the fixing structure is similar to the first exemplary embodiment, and a difference there between lies in structures of the first, the second and the third optical elements 2, 3 and 4.

The first concave portion 24 is removed from the first optical element 2.

The second convex portion 34 is removed from the second optical element 3.

The third convex portion 42 and the third concave portion 44 are removed from the third optical element 4.

In this way, the second exemplary embodiment may also achieve purposes and effects the same with that of the first exemplary embodiment.

Figure 7:
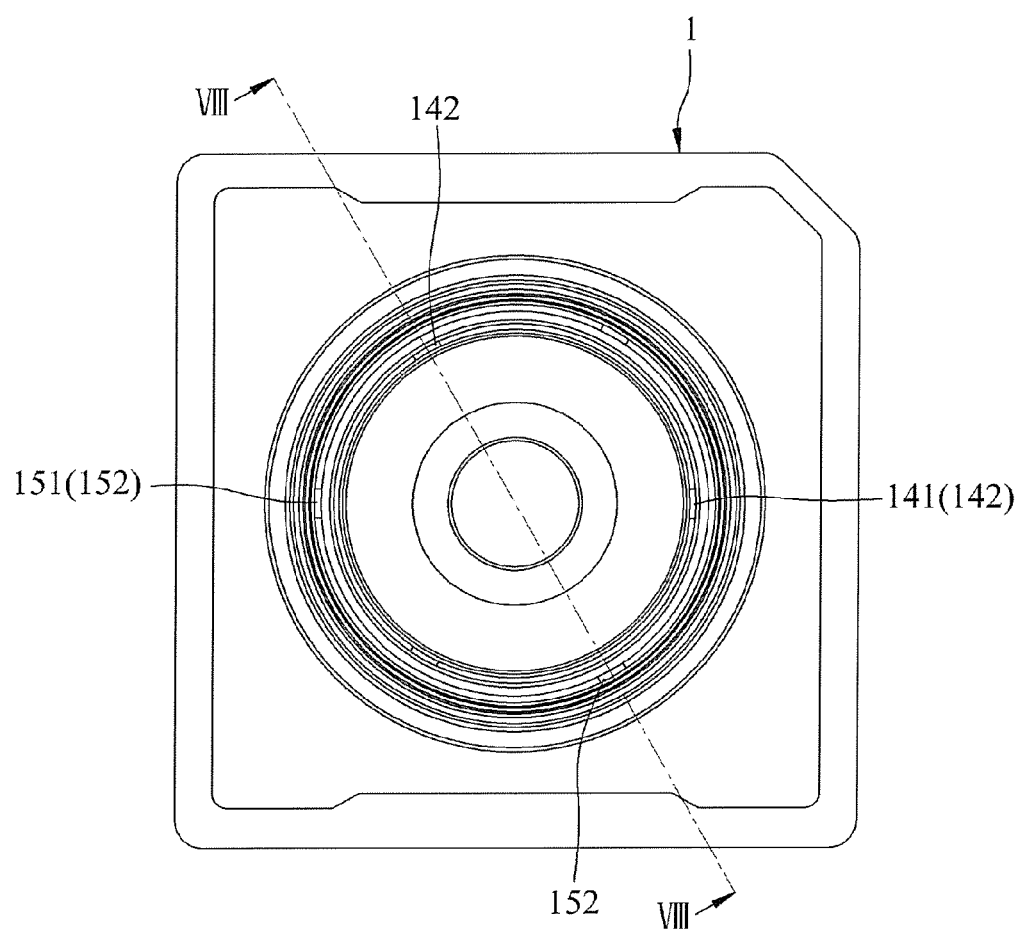
FIG. 7 is a planar diagram of an optical imaging lens with a fixing structure according to a third exemplary embodiment of the invention, in which a first optical element, a second optical element and a third optical element are omitted.
Figure 8:
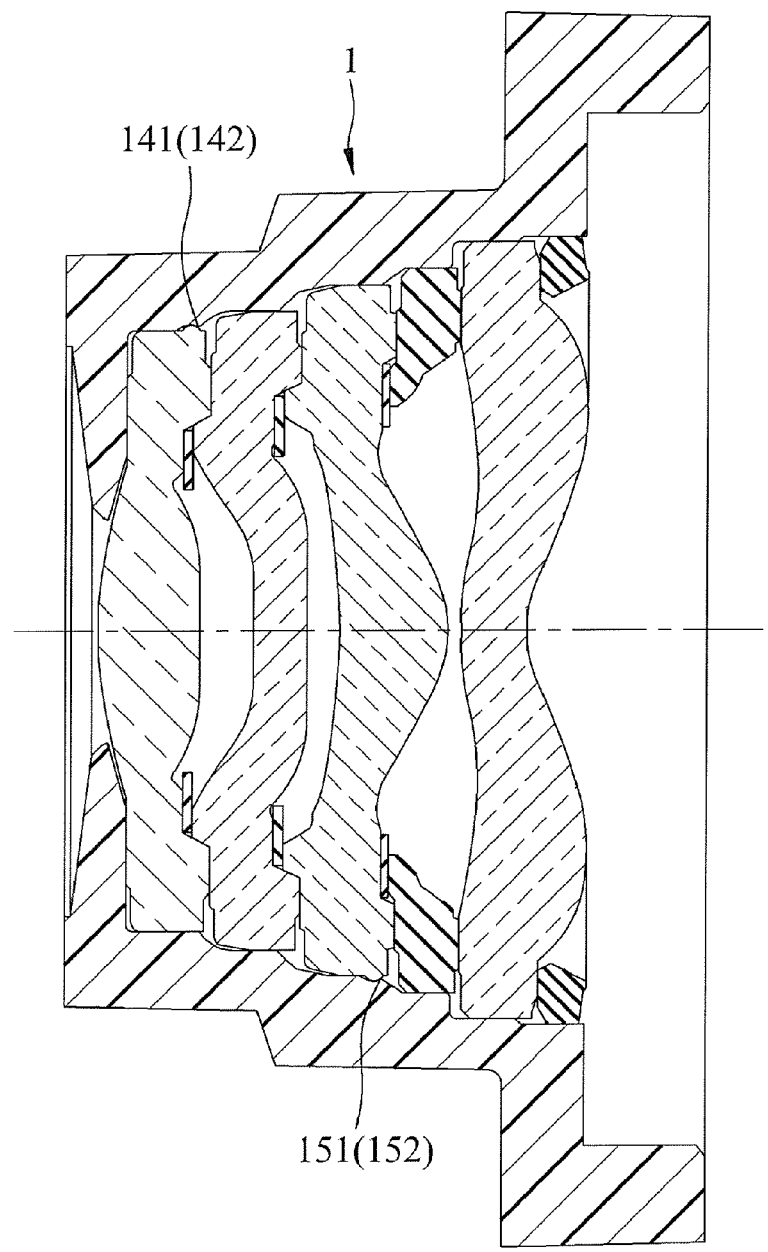
FIG. 8 is a cross-sectional view taken along a section line VIII-VIII in FIG. 7.

Referring to FIG. 7 and FIG. 8, a third exemplary embodiment of the optical imaging lens with the fixing structure is similar to the first exemplary embodiment, and a difference there between lies in a structure of the barrel 1.

The first blocking portion 141 and the second blocking portion 151 are arranged in an interleaving manner, and the first blocking sections 142 and the second blocking sections 152 are arranged in an interleaving manner.

In this way, the third exemplary embodiment may also achieve purposes and effects the same with that of the first exemplary embodiment.

Figure 9:
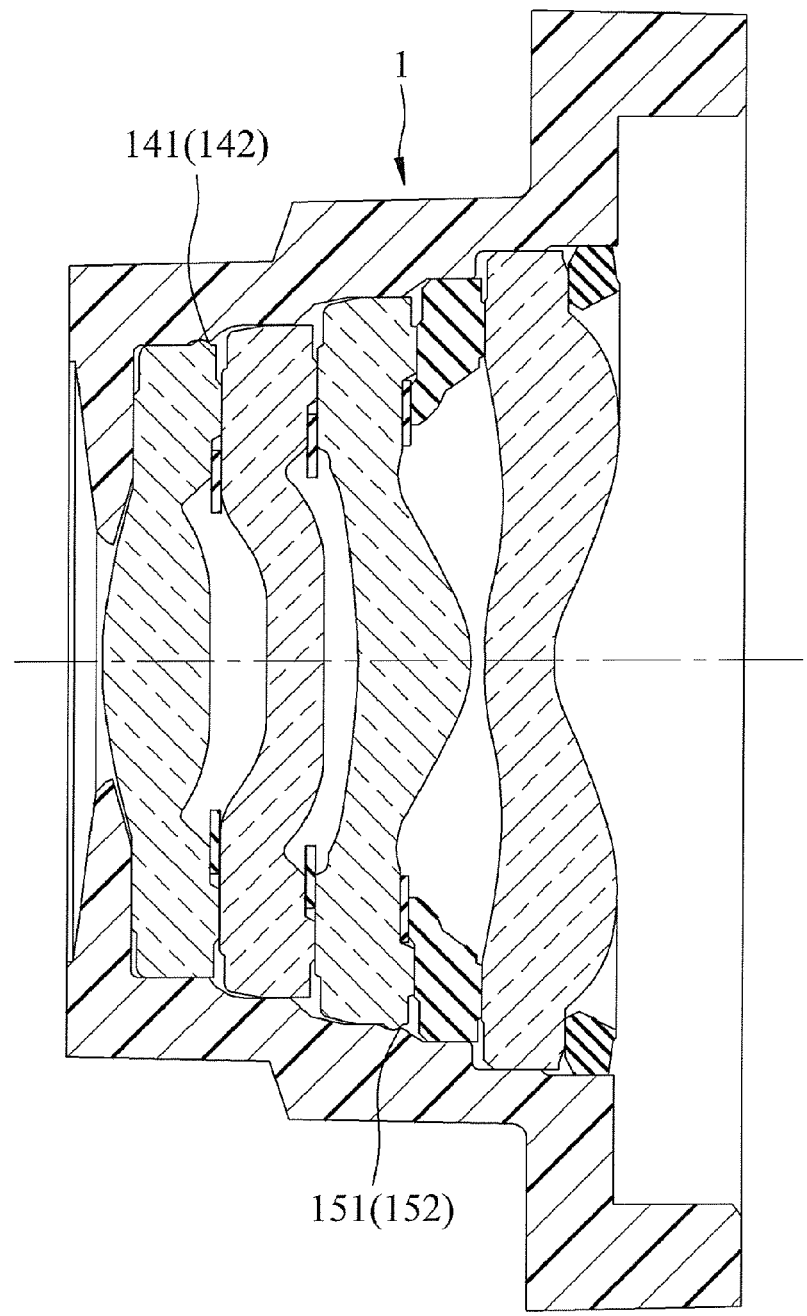
FIG. 9 is a planar cross-sectional view of an optical imaging lens with a fixing structure according to a fourth exemplary embodiment of the invention.

Referring to FIG. 7 and FIG. 9, a fourth exemplary embodiment of the optical imaging lens with the fixing structure is similar to the second exemplary embodiment, and a difference there between lies in the structure of the barrel 1. It should be noted that a view of the barrel of the present exemplary embodiment viewing along a direction from the image side 13 to the object side 12 is the same with that of the third exemplary embodiment, so that FIG. 7 can be directly referred.

In the present embodiment, the first blocking portion 141 and the second blocking portion 151 are arranged in an interleaving manner, and the first blocking sections 142 and the second blocking sections 152 are arranged in an interleaving manner.

In this way, the fourth exemplary embodiment may also achieve purposes and effects the same with that of the first exemplary embodiment.

Figure 10:
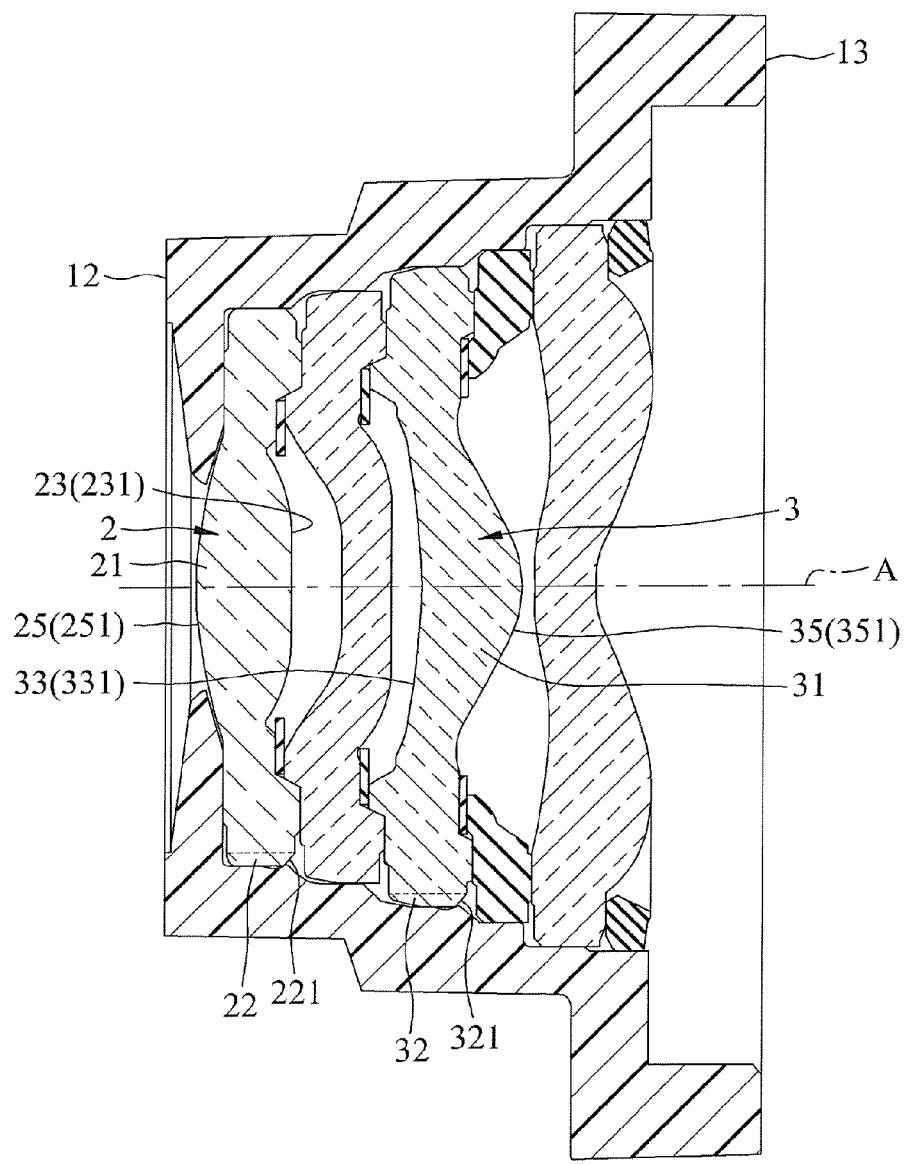
FIG. 10 is a planar cross-sectional view of an optical imaging lens with a fixing structure according to a fifth exemplary embodiment of the invention.
Figure 11:
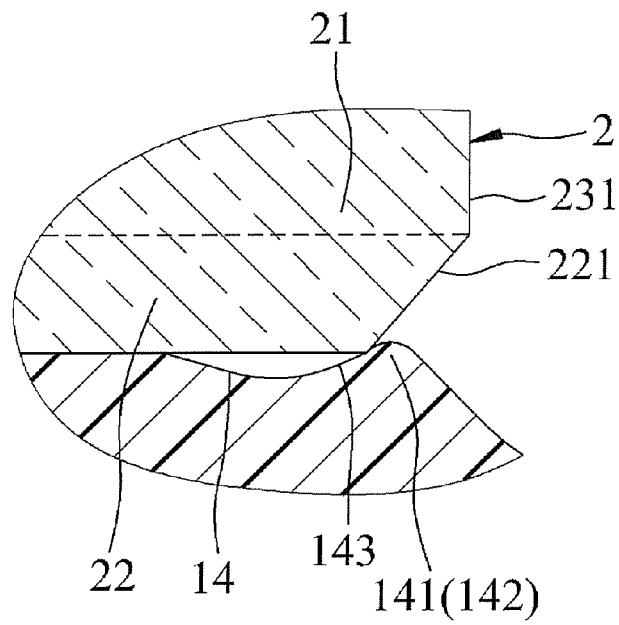
FIG. 11 is a partial enlarged view of FIG. 10, which illustrates a fixing relationship between a first blocking portion and a first stopping portion.
Figure 12:
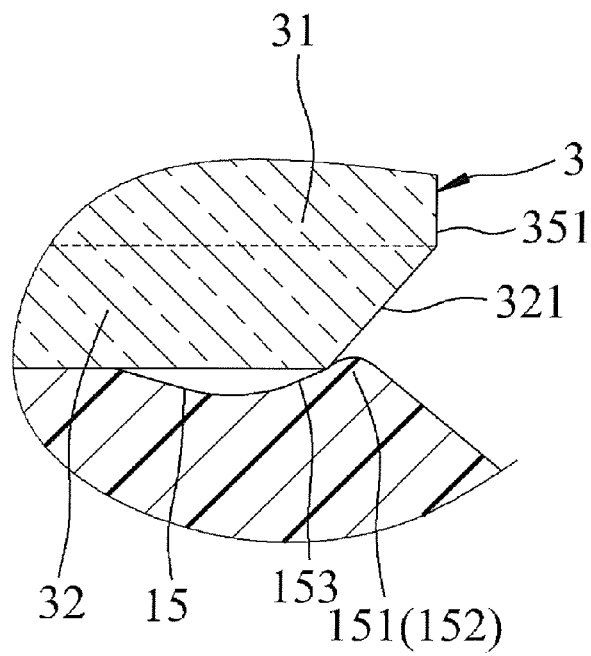
FIG. 12 is a diagram similar to FIG. 11, which illustrates a fixing relationship between a second blocking portion and a second stopping portion.

Referring to FIG. 10 to FIG. 12, a fifth exemplary embodiment of the optical imaging lens with the fixing structure is similar to the first exemplary embodiment, and a difference there between lies in structures of the first and the second optical elements 2 and 3.

The first optical element 2 further includes a first object side surface 25 corresponding to the object side 12. The first image side surface 23 has a body image side surface area 231 corresponding to the first body portion 21. The first object side surface 25 has a body object side surface area 251 corresponding to the first body portion 21. The first stopping portion 22 extends outwards from the first body portion 21 along the radial direction, and is connected around the body image side surface area 231 and the body object side surface area 251, and has the first stopping surface 221. In the present embodiment, the first stopping surface 221 extends towards the axis A in a direction from the object side 12 to the image side 13 and along the radial direction, and presents a bevel chamfer pattern.

The second optical element 3 further includes a second image side surface 35 corresponding to the image side 13. The second object side surface 33 has a body object side surface area 331 corresponding to the second body portion 31. The second image side surface 35 has a body image side surface area 351 corresponding to the second body portion 31. The second stopping portion 32 extends outwards from the second body portion 31 along the radial direction, and is connected around the body image side surface area 351 and the body object side surface area 331, and has the second stopping surface 321. In the present embodiment, the second stopping surface 321 extends towards the axis A in the direction from the object side 12 to the image side 13 and along the radial direction, and presents a bevel chamfer pattern.

In this way, the fifth exemplary embodiment may also achieve purposes and effects the same with that of the first exemplary embodiment.

In summary, as the first and the second blocking portions 141 and 151 respectively lean against the first and the second stopping portions 22 and 32 along the direction of the axis A, the stableness of the first and the second optical elements 2 and 3 along the direction of the axis A is improved. Consequently, a risk of negative impact on image quality due to lens displacement caused by impact of an external force is effectively decreased, so that the purpose of the invention is indeed achieved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical imaging lens with a fixing structure, comprising:
   a barrel, comprising an inner circumferential surface surrounding an axis and defining an accommodation space, an object side and an image side spaced at two ends of the axis and interconnecting with the accommodation space, and a first mounting portion integrally formed around the inner circumferential surface, wherein the first mounting portion comprises a first blocking portion, and the first blocking portion comprises a first blocking surface corresponding to the object side; and
   a first optical element, disposed in the accommodation space, and installed in the first mounting portion, and comprising a first body portion, and a first stopping portion disposed in the first body portion, wherein a distance between a radial outermost edge of the first stopping portion and the axis is greater than a distance between a radial innermost edge of the first blocking portion and the axis, and the first stopping portion comprises a first stopping surface corresponding to the image side and leaning against the first blocking surface, wherein the first blocking portion has a plurality of first blocking sections, the first blocking sections are arranged at intervals along a circumferential direction, and respectively extend towards the axis along a radial direction from the inner circumferential surface, and together form the first blocking surface, and the first stopping portion extends outwards from the first body portion along the radial direction, and is disposed around the first body portion, and protrudes out of the first body portion, wherein one of the barrel and the first optical element has deformable elasticity, and the first stopping surface is only partially contacted with the first blocking surface.

2. The optical imaging lens with the fixing structure as claimed in claim 1, further comprising a second optical element, wherein the barrel further comprises a second mounting portion arranged in line with the first mounting portion along a direction of the axis and integrally formed around the inner circumferential surface, the second mounting portion comprises a second blocking portion, and the second blocking portion has a second block surface corresponding to the object side, the second optical element is disposed in the accommodation space, and is installed in the second mounting portion, and comprises a second body portion, and a second stopping portion disposed in the second body portion, wherein a distance between a radial outermost edge of the second stopping portion and the axis is greater than a distance between a radial innermost edge of the second blocking portion and the axis, and the second stopping portion comprises a second stopping surface corresponding to the image side and leaning against the second blocking surface.

3. The optical imaging lens with the fixing structure as claimed in claim 2, wherein the first blocking portion and the second blocking portion are arranged in an interleaving manner.

4. The optical imaging lens with the fixing structure as claimed in claim 3, wherein the first blocking portion and the second blocking portion extend towards the axis along the radial direction from the inner circumferential surface, and the second stopping portion extends outwards along the radial direction from the second body portion.

5. The optical imaging lens with the fixing structure as claimed in claim 4, wherein the second blocking portion has a plurality of second blocking sections, the second blocking sections are arranged at intervals along the circumferential direction, and are arranged in an interleaving manner with the first blocking sections, and respectively extend towards the axis along the radial direction from the inner circumferential surface, and together form the second blocking surface, the second stopping portion extends outwards from the second body portion along the radial direction, and is disposed around the second body portion, and protrudes out of the second body portion.

6. The optical imaging lens with the fixing structure as claimed in claim 2, wherein one of the barrel and the second optical element has deformable elasticity.

7. The optical imaging lens with the fixing structure as claimed in claim 2, further comprising a third optical element, wherein the barrel further comprises a third mounting portion arranged between the first mounting portion and the second mounting portion and integrally formed around the inner circumferential surface, the second mounting portion is closer to the image side compared with the first mounting portion, the first optical element further comprises a first image side surface corresponding to the image side, and a first concave portion formed on the first image side surface, the second optical element further comprises a second object side surface corresponding to the object side, and a second convex portion extending from the second object side surface to the object side, the third optical element is disposed in the accommodation space, and is installed in the third mounting portion, and comprises a third object side surface corresponding to the first image side surface, a third convex portion extending from the third object side surface to the first optical element and engaged with the first concave portion, a third image side surface corresponding to the second object side surface, and a third concave portion formed on the third image side surface and engaged with the second convex portion.

* * * * *